United States Patent [19]

Teutsch

[11] 3,912,278

[45] Oct. 14, 1975

[54] DISK DRIVE ASSEMBLY

[75] Inventor: Marvin W. Teutsch, Phoenix, Ariz.

[73] Assignee: International Memory Systems, Scottsdale, Ariz.

[22] Filed: July 22, 1974

[21] Appl. No.: 490,574

[52] U.S. Cl. .......................... 274/1 R; 274/2; 360/97
[51] Int. Cl. .......................... G11b 1/00
[58] Field of Search ............ 274/1 R, 2; 360/97, 98, 360/99, 133; 353/57–61

[56] References Cited

UNITED STATES PATENTS

| | | | |
|---|---|---|---|
| 3,710,357 | 1/1973 | Buslik | 360/97 |
| 3,723,980 | 3/1973 | Gabor | 360/98 |
| 3,740,735 | 6/1973 | Gabor | 360/97 |

*Primary Examiner*—Richard E. Aegerter
*Assistant Examiner*—A. J. Mirabito
*Attorney, Agent, or Firm*—Drummond, Nelson & Ptak

[57] ABSTRACT

A memory disk drive unit uses a base casting in which the fan shroud and the filter housing chamber are integrally formed in the casting along with locating openings and surfaces for the motor mount, the disk, and the head positioning mechanism. A cover is placed over the disk and the head positioning mechanism and it has an opening in its upper surface. A circuit board having the majority of the electronic circuit components on it is mounted in the cover opening, thereby forming a closure for the top of the cover. Air under positive pressure passes from the filter housing chamber over the disk, past the head positioning mechanism and outward through an outlet opening in the cover adjacent to the disk drive motor. Most of the heat producing elements are located on the outside edge of the base casting and outside the enclosure for the disk. This minimizes temperature caused movements of the head, and the multi-purpose base casting and the electronics circuit board mounting substantially simplify the construction, assembly, and maintenance of the disk drive unit.

12 Claims, 6 Drawing Figures

DISK DRIVE ASSEMBLY

BACKGROUND OF THE INVENTION

Disk drive units and disk drive controller units are becoming increasingly popular in replacing tape drive units for computers and in new market areas. Such disk drive units require a motor for rotating the memory disk, a head positioning mechanism, and control electronics for interfacing the disk with the equipment with which it is used. In addition, because of the nature of the disk itself, it is necessary to prevent dust particles and other contaminants from settling on the disk and it also is desirable to provide cooling of the electrical and electronic components associated with the disk drive unit.

It has been the practice in the past to provide a suitable chassis or mounting base on which the drive motor, the disk, the head positioning mechanism, the electronics, and a suitable positive pressure filtered air supply are mounted. In most disk drive units presently available, the positive pressure air supply is obtained from a separately mounted fan and shroud and is directed into a cover mounted over the components on the base. The air exits from suitable openings in the cover.

Disk drive units have been relatively expensive to manufacture. Also because the electronic components and drive motor usually are located inside the dust cover over the disk, problems of adequate heat dissipation, testing, and maintenance of the components are encountered.

It is desirable to reduce the cost of disk drive units while at the same time improving the efficiency of their operation and providing maximum accessibility to the electronic and mechanical components for ease of serviceability.

SUMMARY OF THE INVENTION

Accordingly, it is an object of this invention to provide an improved base for a disk drive unit.

It is a further object of this invention to provide an improved disk drive unit which is easier to assemble than prior units.

It is another object of this invention to utilize a cast base in a disk drive unit with previously separately added elements cast as an integral part of the base.

It is an additional object of this invention to minimize the number of heat producing components which are located beneath the cover over the disk of a disk drive unit.

It is yet another object of this invention to locate the major portion of the electronic components of a disk drive unit on a circuit board forming a part of the cover over the memory disk of the unit.

It is a further additional object of this invention to locate the major heat producing elements of disk drive units on the outer edge of the base casting of the units at a maximum distance away from the transducer heads to minimize heat transfer from such heat producing elements to the head positioner.

In accordance with a preferred embodiment of this invention, a disk drive unit comprises a generally flat cast base plate having an upper surface on which a rotatable memory disk and a head positioning mechanism are mounted. The base plate has an integrally-formed fan shroud and filter cavity on its lower surface, with an opening from the filter cavity through the base plate to a position to permit passage of air over the memory disk. An electric motor is located in an opening through the base plate near the outside edge of the casting at a maximum distance away from the location of the pick-up head. Space is left between the motor and the edge of the opening in the base plate to permit convection cooling of the motor by upward movement of air.

A cover is placed over the memory disk and head positioning mechanism, with an opening in the cover opposite the head positioning mechanism and adjacent to the drive motor. The air supplied into the cover through the opening from the filter chamber passes over the disk, past the head positioning mechanism, and out of the cover across the drive motor to aid in cooling the drive motor. The top of the cover has a rectangular opening in it, and a circuit board with the major portion of the electronic components for the disk drive unit fits tightly against this opening to seal it and ro provide ready accessibility to the electronic components. Heat generated by these electronic components is permitted to rise by convection and is outside the enclosure for the memory disk and head positioning mechanism.

DETAILED DESCRIPTION

Figure 1:
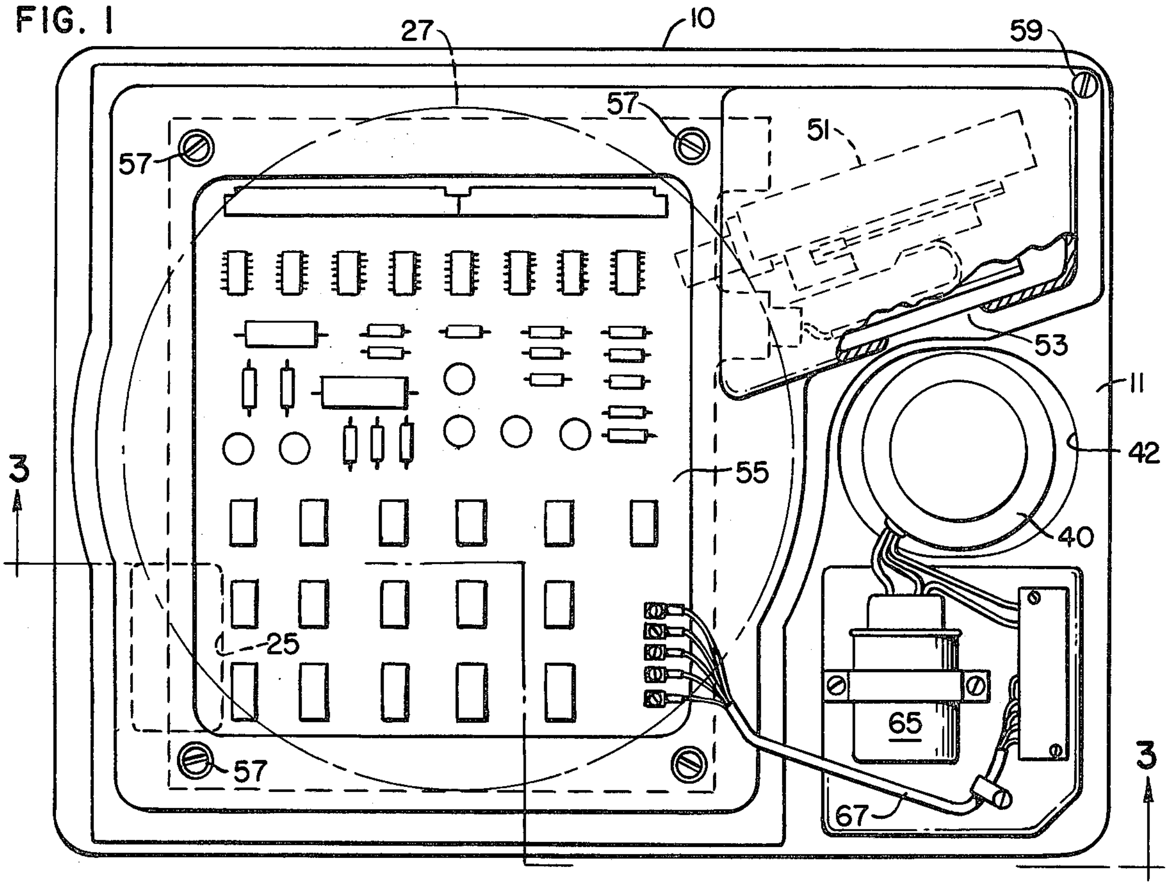
FIGS. 1 and 2 are top and bottom views, respectively, of a disk drive unit made in accordance with a preferred embodiment of this invention.

Referring now to the drawings, in which like reference numbers are used throughout the several figures to denote the same or similar components, there is shown a preferred embodiment of a disk drive unit. In the disk drive unit shown in FIGS. 1 to 6, a rectangular base casting 10 has a support plate 11 which includes locating faces or surfaces on its upper side for mounting a memory disk and head positioning mechanism. The plate 11 on its lower side has an integrally cast fan shroud 12 (best shown in FIG. 6) and a filter housing chamber 13. This minimizes the number of additional components which must be separately added to the base casting 10. In addition, the mounting surfaces for the disk drive unit components are established in the mold from which the base casting is made, thereby facilitating an accurate assembly of the components of the disk drive unit with respect to one another.

Figure 2:
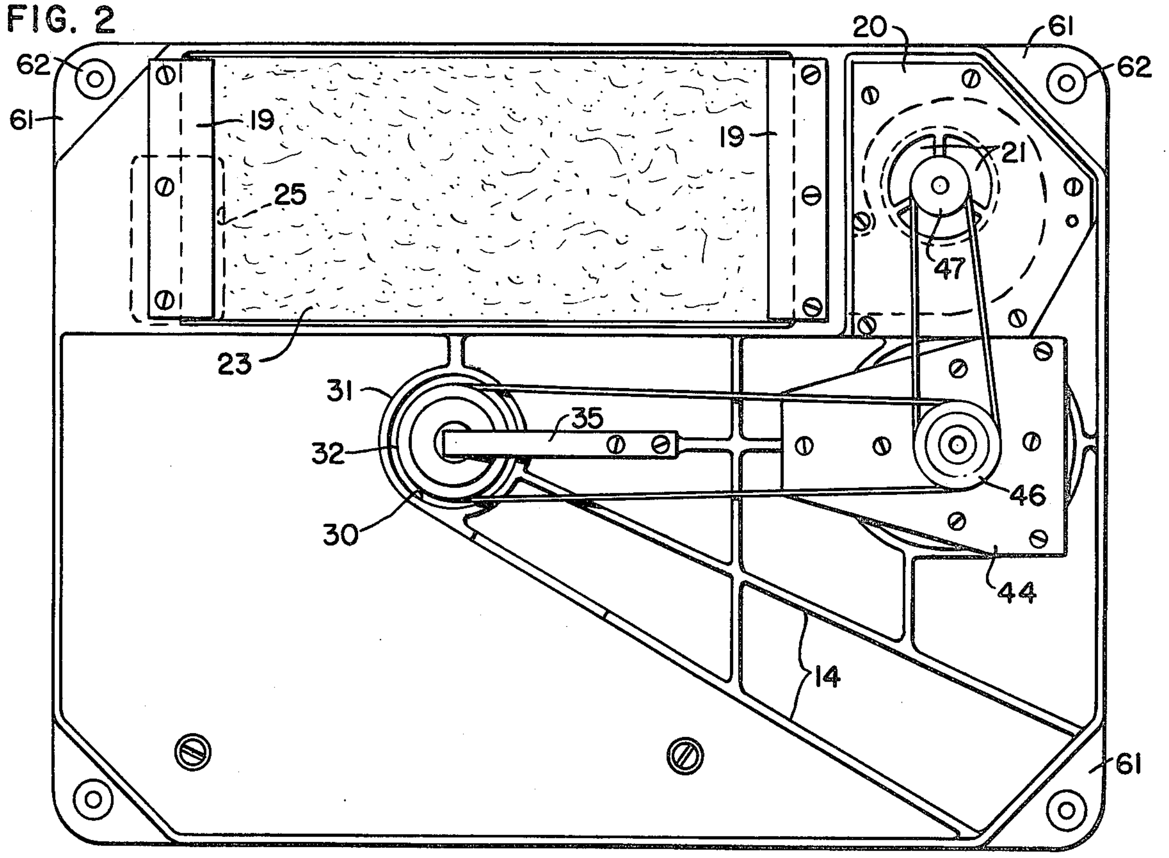
Figure 3:
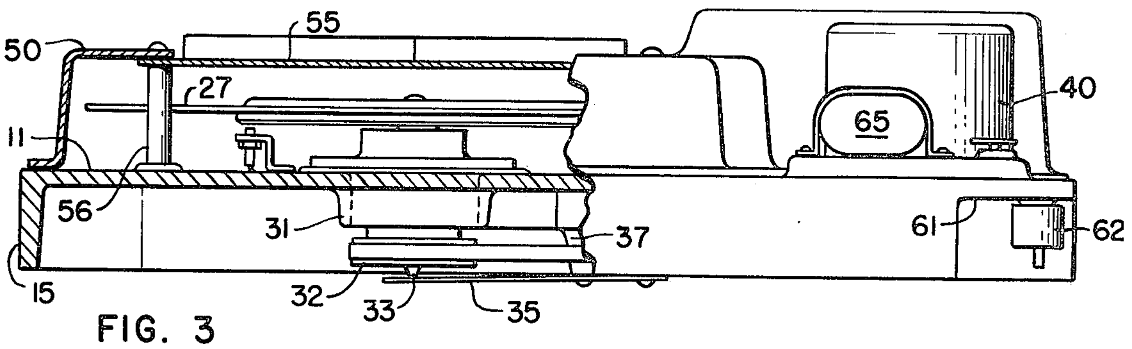
FIG. 3 is a partially cut-away side view of the unit shown in FIGS. 1 and 2.
Figure 6:
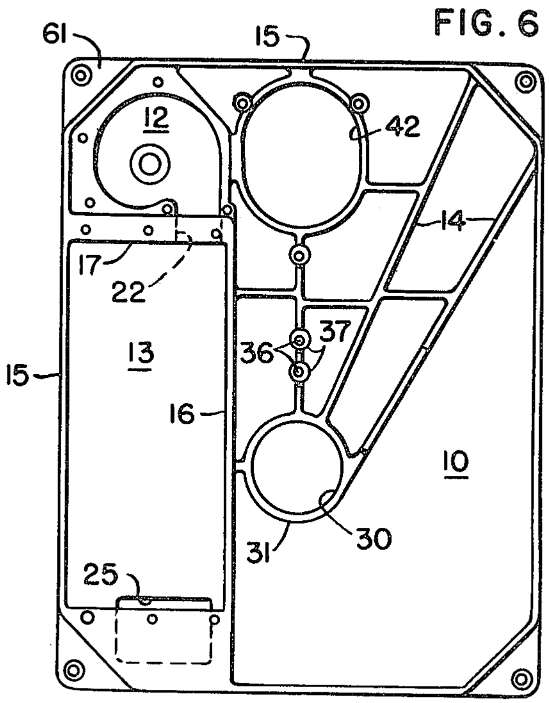

To form the blower housing shroud 12 and the filter housing chamber 13 as part of the base casting, side wall members 15, 16 and 17 extend downwardly approximately 90° from the base plate 11 to the distance shown most clearly in FIG. 3 The fan shroud 12 is cast as a generally scrollshaped shroud for guiding air in the direction of the scroll, as most clearly seen in FIG. 6; and the scroll is formed by a thickened side wall in the casting. Thus, the fan shroud 12 and the filter housing chamber 13 each have one open side, the bottom, which then is covered by a suitable removable cover plate, such as the filter cover plates 19 (FIG. 2) and the fan shroud cover plate 20.

The filter and cover plates 19 completely cover the filter housing chamber to seal the filter chamber opening, whereas the fan shroud cover plate 20 has a provision for mounting a suitable blower wheel on it, as shown most clearly in FIG. 2, and includes openings 21 to permit the fan to draw air through the cover 20 into the shroud 12. The wall 17 has a substantially rectangular opening 22 formed in it interconnecting the exit point of the fan shroud 12 with the filter chamber 13 to permit the passage of air from the fan shroud into a filter 23 placed within the chamber 13.

The filter chamber 13 then is filled with suitable high-quality filter material 23 to entrap any particles of dust or other matter which could interfere with the optimum operation of the disk unit. The filtered air then exits from the filter chamber 13 through an opening 25 located at the end opposite the opening 22 and passes from the filter chamber below the plate 11 through the opening 25 to the upper surface of the base plate 11.

The memory disk 27 may be of any suitable conventional type and is mounted on a locating surface 29 on the upper side of the plate 11. The bearing and driven shaft of the disk 27 are mounted in and pass through an opening 30 (shown most clearly in FIGS. 5 and 6) cast into the base casting 10. A downwardly extending flange 31 (FIG. 3) surrounds the opening 30 on the lower side of the plate 11 and forms a rigid support for the bearing of the disk assembly. The flange 31 does not extend beneath the plate 11 as far as the side walls 15 in order to provide room for a driven pulley 32 connected to the disk shaft 33. The shaft 33 is electrically grounded to base casting 10 through plate 35, which is mounted by self-tapping screws or the like in a pair of tapped holes 36 formed in a pair of support posts 37 (FIGS. 3 and 6) on the lower side of the plate 11.

Figure 4:
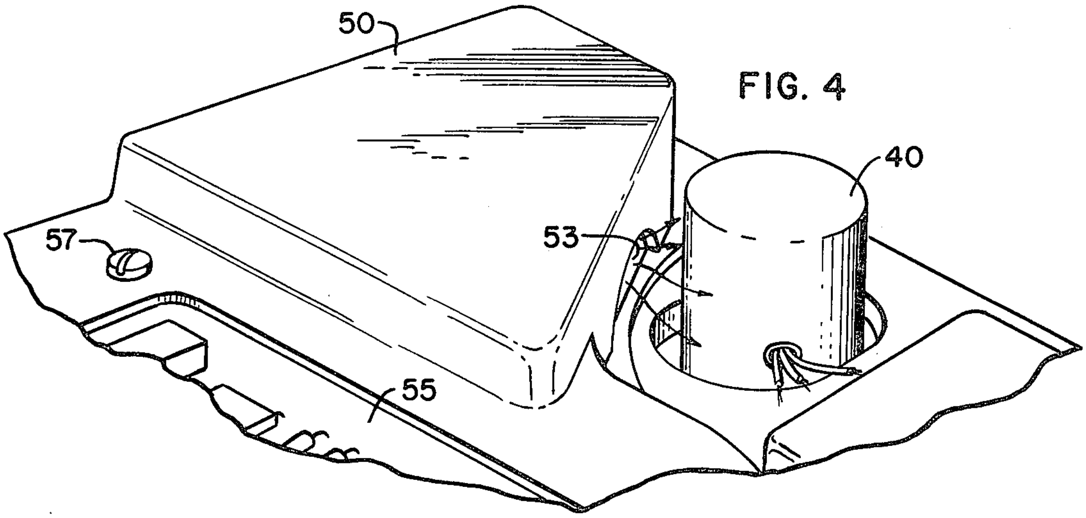
FIG. 4 is a perspective view showing some details of the unit shown in FIGS. 1, 2 and 3.
Figure 5:
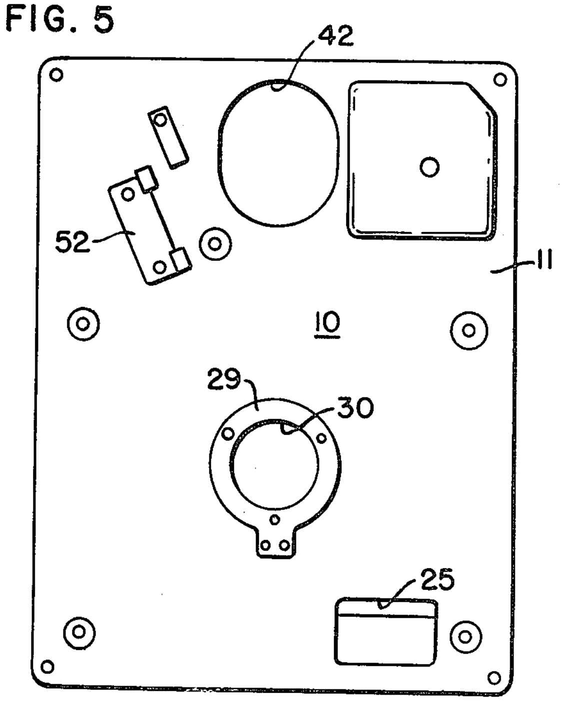
FIGS. 5 and 6 are top and bottom views, respectively, of the base casting of the unit shown in FIGS. 1, 2, 3 and 4.

A drive motor 40 is mounted in an opening 42 formed in the base plate 11 adjacent the fan shroud member 12; and, as most clearly seen in FIG. 4, has an outside diameter which is less than the size of the opening 42. In addition, the motor 40 is mounted to have minimum contact with the base casting by attaching it to a three-point mounting plate 44 (FIG. 2) which has clearance around it to permit convection cooling of the motor by the movement of air upward from beneath the plate 11, past the motor 40 in the opening between the motor and the side walls of the opening 42 in the base plate 11.

The support surfaces in the casting 10 for the fan shroud cover 20 and the motor mounting plate 44 extend the same distance beneath the lower side of the plate 11 as the bottom edge of the flange 31 to accommodate a driving pulley 46 attached to the motor drive shaft beneath the plate 44 and a driven pulley 32 for the disk and a driven pulley 47 for the fan. This causes all of these moving parts to be located in a plane which is nearer the undersurface of the base 11 than the plane formed by the outermost extended edges of the sides 15 of the casting.

The cover plate 19 for the filter chamber, the fan shroud cover plate 20, the motor mounting plate 44, and the disk drive shaft grounding plate 35 all preferably are mounted by self-tapping screws threaded into pre-formed holes in the base casting 10 to simplify the assembly and the removal of parts of the disk drive unit.

Since the disk 27 must be operated in an environment which is dust-free, a plastic cover 50 is placed over the disk and over the head or transducer positioning linear drive motor 51 (shown in dotted lines in FIG. 1). The linear motor 51 is mounted on a mounting surface 52 (FIG. 5) which is machined, along with the mounting surface 29 after the casting has been completed, to lie in the same plane as the mounting surface 29. This then facilitates accurate location of the head positioning mechanism with the disk 27 as determined by the base casting 10 itself.

To provide additional rigidity between the mounting for the disk 27 and the linear head positioning motor 51, a pair of support ribs 14, extending generally in the direction between the opening 30 and underlying the mounting surface 52, are cast into the underside of the base casting 10. These ribs 14 further insure that the mounting surfaces 29 and 52 are maintained in precise aligned relationship with one another even if the casting 10 should undergo stresses which would tend to warp or twist it.

Air passing upwardly through the opening 25 in the plate 11 maintains positive air pressure within the cover 50, and passes over and around the disk 27 which rotates in a direction to aid the air flow. After passing over the disk 27, the air passes over the linear head positioning motor 51 and exits through an outlet 53 in the plastic cover 50 adjacent the disk drive motor 40 to cool the motor 40.

The cover 50 has a rectangular opening in its top directly over the disk 27. The major portion of the electronic components for operating and controlling the disk drive unit are mounted on a single circuit board 55 secured in this opening on four mounting posts 56 at its four corners above the disk 27. To prevent air leakage, the circuit board 55 fits tightly against a gasket seal on the underside of the cover 50 around the opening. Threaded fasteners 57 pass through the cover 50 and the corners of the circuit board 55 into the mounting posts 56 to secure the unit together and to mount the cover and circuit board to the upper surface of the plate 11. Additional fasteners such as the screw 59 can be used to secure the outward flaring flange of the cover 50 to the plate 11 in the location near the head positioning motor 51 (FIG. 1), if this is desired or necessary. A gasket (not shown) also may be placed between the bottom flange of the cover 50 and the plate 11 to further prevent air leakage if desired.

The electronic components on the circuit board 55 are indicated generally in FIG. 1 and are located on the top side of the circuit board 55 outside of the chamber enclosing the disk 27. As a consequence, heat generated by the electronic components is permitted to rise by convection and does not affect the head positioning area of the unit. The circuit board 55 serves the dual purpose of mounting the electronic components and also serves as the upper portion of the cover over the disk 27. This location permits ready access to the electronic circuit components for the purpose of replacement and/or testing since the test points for the circuit all can be brought out to the upper surface of the circuit board 55.

As best seen in FIGS. 2 and 6, the side wall 15 does not extend all the way to the corners of the plate 11 but cuts diagonally across these corners leaving an outwardly extending flange 61 at each corner. Shock mountings 62 then are mounted at each of these outside corners of the base casting to permit the shock mountings to be easily accessible for subsequent installation and removal of the unit in rackmounted equipment or the like.

A power supply section 65 for the disk drive unit is mounted on the upper surface of the plate 11 adjacent the motor 40 at the corner opposite the head positioning mechanism 51. Since the power supply section of the assembly generates heat, it is located as far from the head positioning mechanism as possible, as is most clearly seen in FIG. 1. This power supply section 65 includes suitable means for connection to a source of operating power for the motor 40 and also includes connectors for input of electric power to the circuit board 55. An interconnecting cable 67 illustrates such a connection. Of course, additional interconnections are made from the circuit board 55 to the linear head positioning motor 51. These electrical and electronic interconnections may be of any suitable configuration and are not essential to an understanding of the mechanical features of the system which has been described.

It should be noted that the location of the heat producing elements, such as the motor 40 and the power supply 65, on the outside edge of the casting is such that these elements are located at a maximum distance away from the transducer heads for the disk 27. They also are outside the cover 50 which maintains the positive filtered air pressure over the disk 27. As a consequence, minimum movement of the heads is caused due to heat transfer to the casting at the head position, which is critical to proper operation of a disk drive. Heat transfer from the motor 40 is further minimized by the use of the substantially triangular-shaped mounting plate 44 and the three-point mounting which is illustrated.

By using an aluminum cast base, with the various features cast into it as described above, in conjunction with the assembly of the cover 50 and the circuit board 55, cost savings in the manufacture of a disk drive unit have been realized in the amount of 50 to 60 percent over disk drive units made in accordance with conventional techniques.

I claim:

1. An integrally formed base unit for a disk drive having at least first and second major surfaces comprising:

a plurality of component mounting faces on said first major surface of said base unit for supporting components to be mounted thereon, said component mounting faces being located at predetermined distances from one another and in predetermined planes relative to one another;

a fan shroud member formed as part of said base unit on said second major surface thereof for receiving a fan and directing the air flow produced thereby;

a filter housing chamber formed as part of said base unit on said second major surface thereof with walls extending from said second major surface a predetermined amount therefrom, the open side of said chamber formed by said walls opposite said second major surface being adapted for closure by a cover plate, one of said walls being common with a portion of said fan shroud member and having a first opening therein for permitting passage of air from said fan shroud member to said filter housing chamber, a second opening provided through said base unit into said filter housing chamber at a point remote from said first opening to permit air to pass out of said chamber to a point above said first major surface of said base unit; and means formed in said base unit for mounting a drive motor in a predetermined location relative to said fan shroud member.

2. A base unit according to claim 1 wherein said base unit, said fan shroud member, and said filter housing chamber all are formed as a single one-piece casting.

3. A base unit according to claim 1 wherein said base unit has a hole therethrough adjacent said fan shroud member, and said means for mounting a drive motor includes a drive motor mounting member integrally formed as part of said base unit and located about the periphery of the hole in said base unit.

4. A base unit according to claim 3 wherein said base unit has a further hole therethrough for locating and mounting at least the driven shaft of a memory disk, said fan shroud member and the holes in said base unit being arranged in a triangular configuration.

5. A base unit according to claim 4 wherein said plurality of component mounting faces include at least a disk support mounting face and a head positioning mechanism mounting face spaced from one another and located in the same plane, said disk mounting face located adjacent the further hole in said base unit, and said base unit further including integrally formed support ribs extending outwardly from said second major surface of said base unit and located to generally underlie the region between said disk support mounting face and said head positioning mechanism support mounting face.

6. A disk drive assembly including in combination:

a base member having support surfaces thereon for at least a disk memory unit, a memory unit transducer positioning mechanism, and a drive motor for rotating said disk;

a cover attached to said base for enclosing the space occupied by a disk memory unit and a transducer positioning mechanism, said cover having an opening in it in an area substantially overlying the location of a disk memory unit on said base member; and an electronic circuit board mounted in the opening in said cover to close such opening, electronic components on said circuit board being mounted on the surface outside the enclosure formed by said cover and said circuit board to permit access to such components.

7. The combination according to claim 6 wherein said base member includes an opening for admitting air into the enclosure formed by said cover at a point remote from the location of a transducer positioning mechanism, and another opening is provided in said cover at a location adjacent the location of such mechanism, so that air entering the enclosure from said first opening in said base member exits through said another opening in said cover to provide positive pressure air flow over a disk and to cool such positioning mechanism after passage over the disk.

8. A memory disk drive comprising in combination:

a generally flat base plate having first and second mounting faces located on the upper surface thereof for mounting a rotatable memory disk and for mounting a transducer positioning mechanism at predetermined relative locations, said base plate including a first opening therethrough adjacent said first mounting face for accommodating at least the shaft of a memory disk extending through said plate beneath the lower surface thereof and including a second opening therethrough for mounting a disk drive motor therein;

a fan shroud and filter cavity integrally formed on the lower surface of said base plate adjacent one another, with a passage extending from an outlet in said fan shroud into said filter cavity, said fan shroud and said filter cavity each being open on one side opposite the lower surface of said base plate, said base plate having a third opening therethrough into said filter cavity at a location remote from the opening between said filter cavity and said fan shroud;

a disk drive motor mounted in said second opening and being smaller than said second opening to permit the passage of air through said second opening around said motor;

a cover attached to the upper surface of said base plate and substantially enclosing the region occupied by said memory disk and said transducer positioning mechanism, said cover having an air outlet opening at a point opposite said transducer positioning mechanism, with the third opening through said base plate from said filter cavity located on the opposite side of said disk from the air outlet opening in said cover, said cover having a second opening in the upper portion thereof substantially overlying the location of said memory disk;

a circuit board mounted in the second opening in said cover and having electronic components mounted thereon on the surface outside the enclosure formed by said cover and said circuit board.

9. The combination according to claim 8 wherein said base plate, said fan shroud, and said filter cavity all are formed as a single casting.

10. The combination according to claim 8 wherein said base plate is substantially rectangular in shape and includes an outwardly projecting flange at each corner for accommodating shock absorbing mountings easily accessible for installation and removal of said disk drive controller.

11. The combination according to claim 8 further including a fan mounted on a plate enclosing said fan shroud and including means interconnecting said fan with said drive motor for rotation thereby;

filter material in said filter chamber and a cover plate over said filter chamber to seal said chamber and hold said filter material in place;

a memory disk mounted on said first mounting face and having a shaft extending through the first opening in said base plate, with means interconnecting said disk shaft with said drive motor.

12. The combination according to claim 11 wherein said drive motor projects upwardly through the second opening in said base plate above the upper surface thereof and the air outlet opening in said cover is located opposite said drive motor so that air exiting from said cover passes over said drive motor to cool the same.

* * * * *